O. B. CARSON.
OPHTHALMIC MOUNTING.
APPLICATION FILED JAN. 18, 1919.
1,306,521.
Patented June 10, 1919.
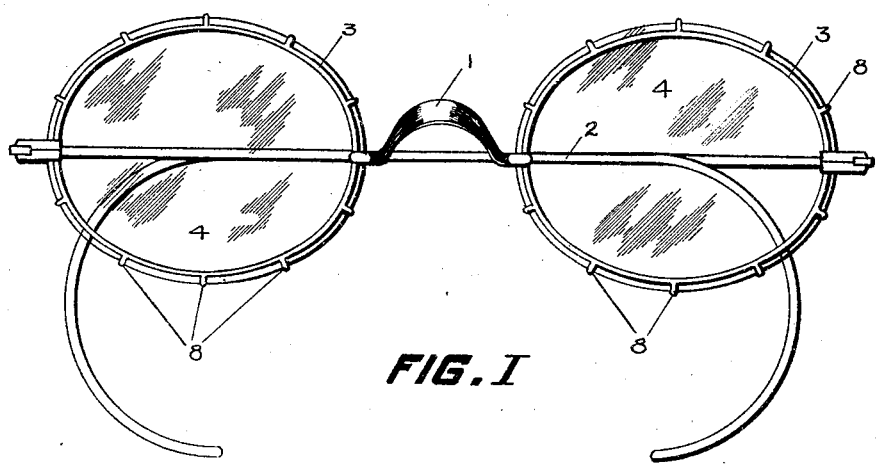
FIG. I
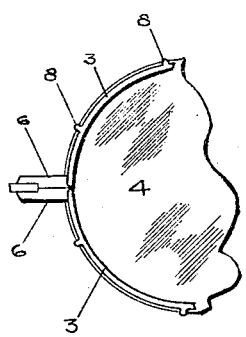
FIG. II
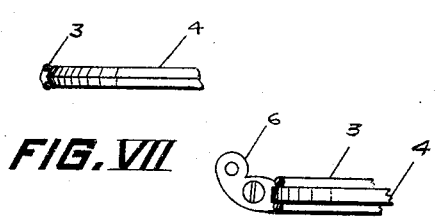
FIG. VII
FIG. III
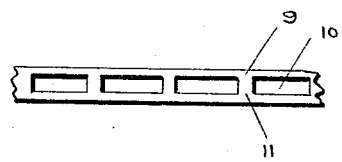
FIG. IV
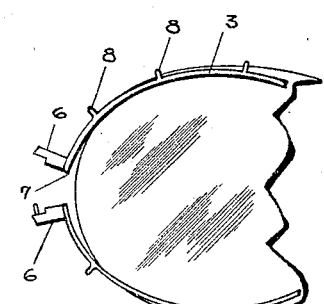
FIG. V
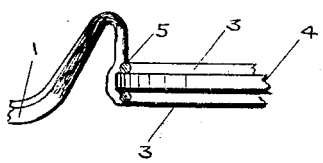
FIG. VI
INVENTOR
O. B. CARSON
BY
H. H. Styll & H. K. Parsons
ATTORNEYS

UNITED STATES PATENT OFFICE.

OSWALD B. CARSON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,306,521. Specification of Letters Patent. Patented June 10, 1919.

Application filed January 18, 1919. Serial No. 271,788.

*To all whom it may concern:*

Be it known that I, OSWALD B. CARSON, a citizen of the United States, residing at Southbridge, in the county of Worcester and State of Massachusetts, have invented certain new and useful Improvements in Ophthalmic Mountings, of which the following is a specification.

This invention relates to new and useful improvements in ophthalmic mountings and more particularly to spectacle and eyeglass frames, the main object of the present invention being the provision of a spectacle or eyeglass frame wherein the lens rings are so constructed that they will be extremely light in weight, durable in construction and inexpensive to manufacture.

Another object of the present invention is the provision of a lens frame to be used in connection with eyeglasses and spectacles, which is of open work construction, thus reducing the use of material, which in turn will reduce the cost of production, while at the same time will provide a strong and durable frame.

With the above and other objects in view the invention consists in the novel construction and arrangement of parts hereinafter more fully set forth, pointed out in the claims, and shown in the accompanying drawings, in which:

Figure I is a front elevation of a spectacle constructed in accordance with my invention.

Fig. II is an enlarged detail view of one end of the spectacle frame.

Fig. III is a detail top plan view, the frame being illustrated in cross section.

Fig. IV is a detail plan view of a modified form of blank to be used in the construction of the frame.

Fig. V is a detailed elevation illustrating the manner of constructing the ends of the frame.

Fig. VI is a detail top plan view illustrating the manner of connecting the frame with the ends of the bridge.

Fig. VII is a similar view illustrating the application of the frame to a bevel edged lens.

Heretofore in the manufacture of spectacles and eyeglasses wherein lens rims or frames are provided for retaining the lenses in position, the usual continuous solid rim has been used, but in order to reduce the cost of production and at the same time provide a light and durable lens frame, I have produced herewith a frame constructed entirely of light wire material, and in Fig. I of the drawings, wherein the numeral 1 indicates the bridge portion of the usual spectacle, and 2 indicates the temples, I have illustrated my improved spectacle frame. In the construction of this frame I provide two wire members, as illustrated at 3, arranged upon opposite sides of the lenses 4 at a point adjacent the edge of the lens, the ends of said wire members preferably meeting beneath the end of the nose bridge to which they are securely soldered, as illustrated in Fig. VI and indicated in this view by the numeral 5. The intermediate portions of these wires are looped over the inner reduced end of the temple lugs 6, which are preferably reduced in order to accommodate the loop 7 formed at the intermediate portion of the wires, this feature being clearly illustrated in Fig. V.

In the construction of the frame it will be noted that one piece of wire can be used by bending the ends of the wire over one of the reduced ends of the temple lugs and soldering the same thereto, while the intermediate portion of the wire can be looped over the reduced end of the remaining temple lug, but on the other hand two wires can be used, each wire having its intermediate portion looped over the temple lugs, while the ends thereof can be soldered beneath the ends of the bridge member. It is preferred, however, to use only a single wire having its ends as described above, secured to one of the temple lugs, and its intermediate portion secured to the remaining temple lug.

Now, in order to secure these side wires 3 in their proper positions upon opposite sides of the lenses 4, I provide suitable cross wires 8, of substantially U-shaped formation, so as to engage over the edge of the lenses, and having their ends soldered or otherwise secured to the side wires 3. Any number of these connecting wires 8 may be used and they may be integrally formed with the side wires 3, or secured thereto in any suitable manner. It will be noted that by having these connecting wires 8 engaged over the edges of the lenses at various points it will provide a light and durable frame for the lenses and will produce a frame which is extremely simple to manufacture.

In Fig. IV, I have illustrated a slightly modified form of the invention, wherein the frame is composed of a single strip of metal 9, having stamped therein suitable rectangular openings 10, leaving the cross connecting members 11, and it will be noted that this strip of metal, after the openings have been stamped therein, can be readily used in place of the wire frame above described.

In Fig. VII, I have illustrated the wire frame as applied to a lens having a beveled edge, and it will be noted that the side wire members 3, are preferably disposed against the opposite beveled faces of the lens, while the connecting wires 8' engage over the extreme edge of the lens. In this form of the invention it will be noted that the side wires 3 of the frame are removed from the line of vision and are so arranged upon the lens that they will not only provide a neat frame but will provide a frame which will securely retain the lenses in their proper positions.

In Fig. III, I have illustrated more clearly the manner of securing the wire to the temple ends, and it will be noted from this illustration that the temple ends are provided at their inner ends with suitable recesses to receive a portion of the lens, thus having portions of the inner ends of the temple ends straddling the edge of the lens, whereby to provide means to which the wire frames are secured.

From the above description taken in connection with the accompanying drawings it will be readily apparent that I have provided a simple and durable lens frame for spectacles and eyeglasses, to replace the continuous metal and non-metallic rims in use at the present time. It will be apparent that my improved lens frame can be quickly and readily applied to the lenses and is secured in such a manner to the nose bridge and temple ends that it will be rigidly held in position upon the lens after being placed in position.

I claim:

1. A lens frame for spectacles, including continuous members disposed upon opposite sides of the lenses, transverse members connecting the continuous members and engaged over the edges of the lenses, and means for securing the continuous members in position upon the lenses.

2. A spectacle frame, including a nose bridge, temple ends and temples secured thereto, a lens frame including continuous side wires secured to the nose bridge and temple ends, and cross members connecting the side wires, as and for the purpose set forth.

3. A spectacle frame, including a nose bridge and temple ends, lens frames including side wires arranged upon the lenses adjacent the edges thereof, connecting members for said side wires adapted to engage over the edges of the lenses, and means for connecting the side wires to the nose bridge and temple ends, as and for the purpose set forth.

4. A spectacle frame, including a nose bridge and temple ends, a lens frame including a single piece of wire having its ends secured to one of the temple ends, the portions of the wire being then disposed upon opposite sides of the lens adjacent the edge thereof and its intermediate portion looped over the inner end of the opposite temple end, and cross members connecting the two side portions of the wire and engaged over the edge of the lens, as and for the purpose set forth.

In testimony whereof I have affixed my signature, in presence of two witnesses.

OSWALD B. CARSON.

Witnesses:
H. E. COLEMAN,
E. M. LOFLER.

Copies of this patent may be obtained for five cents each, by addressing the "Commissioner of Patents, Washington, D. C."